Nov. 1, 1932.  J. A. NOLAN  1,886,116
FISH LURE
Filed Nov. 20, 1931

Inventor
Joseph A. Nolan
By Clarence A. O'Brien
Attorney

Patented Nov. 1, 1932

1,886,116

UNITED STATES PATENT OFFICE

JOSEPH A. NOLAN, OF FORT PIERCE, FLORIDA

FISH LURE

Application filed November 20, 1931. Serial No. 576,358.

This invention relates to certain new and useful improvements in fish lures or bait, and the primary object is to provide a lure simulating a minnow or other desired type of fish and provided with improved pilot means serving to maintain the lure a desired distance below the level of the water and at the same time to offer little or no restriction to the movement of the lure as it is pulled through the water.

A still further object of the invention is to provide a fish lure or bait that is highly attractive to game fish.

Other objects and advantages of the invention will become apparent from a study of the following description, taken in connection with the accompanying drawing wherein.

Figure 1:
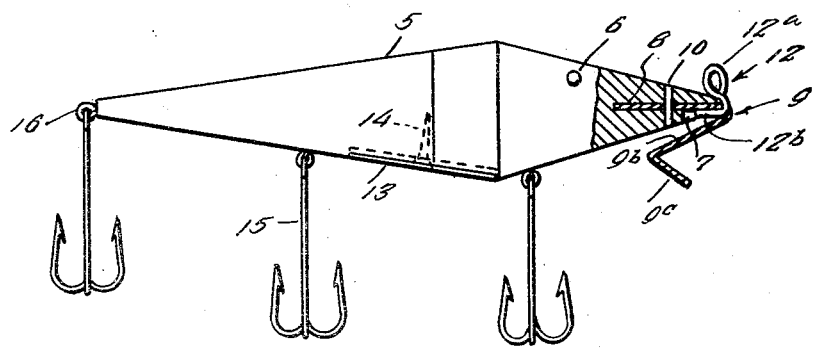
Figure 1 is a side elevational view of the lure parts thereof being broken away and shown in section.
Figure 3:
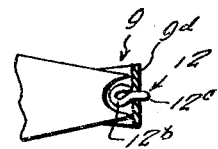
Figure 3 is a fragmentary sectional elevational view of one end of the lure for clearly showing the manner for securing the pilot and the coupling ring to the forward end of the lure body.
Figure 2:
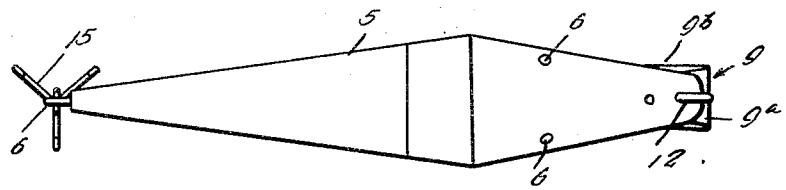
Figure 2 is a top plan view of the lure.

Referring more in detail to the drawing, it will be seen that the improved fish lure comprises a body 5 that is of suitable length and preferably cylindrical in cross section, the body 5 from a point adjacent the forward end thereof tapers in opposite directions toward the end of the body, and said body may be colored as found desirable. The shorter tapered portion of the body may be considered the front thereof and at said end the body is equipped with suitable elements 6 simulating eyes, and which are properly positioned. At said end, the extremity of the body on its under side is notched as at 7. Also at said extremity the body is split longitudinally as at 8.

Figure 4:
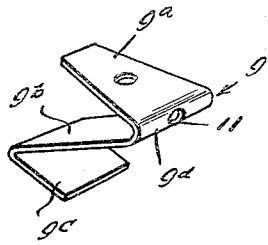
Figure 4 is a perspective view of the pilot.

My improved pilot is designated generally by the reference character 9, and in the present instance is formed from a single blank of metal or other suitable material bent into a substantial Z. (See Figure 4). One end 9a of the pilot is fitted within the slit 8 and is securely anchored therein through the medium of a pin 10, end 9a being suitably apertured to accommodate the pin.

With the pilot plate secured in this manner on the body it will be seen that the intermediate portion 9b of the pilot which is inclined at an angle to the perpendicular extends inwardly and rearwardly in slightly spaced parallelism with a proximate portion of the body 5. The free end 9c of the pilot plate is also disposed at an angle to the perpendicular and at an acute angle to the intermediate part 9b and extends forwardly and downwardly, preferably terminating inwardly from the corresponding end of the body 5.

The bend 9d of the plate which connects the corresponding end of the portions 9a, 9b is provided with an aperture 11.

An attaching or coupling ring 12 is provided, and the same is preferably formed from a single length of wire suitably bent and twisted to provide the eye portion 12a adjacent one end, and an eye portion 12b that is slightly smaller than the eye portion 12a located adjacent a relative opposite end of the wire and disposed at substantially right angles to the eye 12a. The portion 12c connecting the eyes is suitably curved and passes through the opening 11 in the part 9d of the pilot plate 9.

In this connection it will be noted that the section or part 9b of the pilot is so arranged relative to the notch 7 as to aid in retaining the eye 12b of the member 9 within the notch 7, which eye 12b is normally urged inwardly of the notch 12 by the pull exerted on the line attached to the eye 12a of the member 12 when the lure or bait is being drawn through the water. The section 9b also serves to regulate the depth to which the body 5 will drive as the lure is being drawn through the water.

Figure 5:
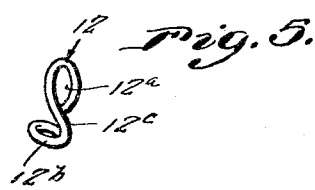
Figure 5 is a perspective view of the coupling ring.

In actual practice the wire forming the coupling member 12 before being bent into the position shown in Figure 5 is first passed through the opening 11 and one end of the wire then bent to form the eye 12a, and the opposite end of the wire bent to form the eye 12b which fits within the recess or notch 7.

With the coupling member 12a secured in this manner at the front end of the body 5 it will be seen that the coupling member cannot be readily and easily disengaged from the body and when the fish line has been secured to the eye 12a of the member 12 in a secure manner, the possibility of the fish lure becoming lost or disengaged from the line is reduced to a minimum.

The body 5 on that portion of the body tapering toward the rear end thereof is provided on its underside with a notch within which is fitted a metallic plate 13 that is secured against displacement through the medium of a screw 14.

The plate 13 is preferably of such a material that it will show very brightly under the water and will serve to attract the attention of the game fish as the lure is being pulled through the water.

In actual practice, one end of the line is attached to the eye 12a of the coupling member 12, and the bait or lure is drawn through the water. As the bait is drawn through the water section 9c of the member 9 will cause the body to dive down into the water, while the pressure of the water against the part 9b will serve in conjunction with the speed of movement of the bait thru the water to regulating the diving depth, and also will cause the body to swing laterally back and forth so that the bait in moving through the water will move in a manner simulating the swimming movement of a minnow.

The body 5 is also equipped with a plurality of multiple fish hooks 15 of which preferably two are connected to the bottom of the body 5, and a third connected to the body 5 at the rear end thereof.

As shown, each of the hooks 15 has the shank thereof provided with an eye that is loosely engaged with an eye screw 16 screwed into the body 5 and affording an efficient means for connecting the fish hook with the body.

Even though I have therein shown and described the preferred embodiment of the invention, it is to be understood that the same is susceptible of further changes, modifications and improvements coming within the scope of the appended claims.

Having thus described my invention, what I claim as new is:

1. A fish lure comprising a body tapered in opposite direction, members on said body adjacent one end to simulate eyes, means on said body providing a lure or attraction for the fish, hooks on said body to engage the fish, a pilot member secured to the body at said one end and provided with an aperture, and means at said one end engageable with the pilot for connecting a fish line to the body, said last named means comprising a member extending through the aperture in said pilot member and embracing the adjacent end of said body and having its opposite end portions provided with eyes.

2. A fish lure including in combination a body having a recess in the under side of one end thereof, a pilot member secured to the recessed end of said body and provided with an aperture and a device for coupling the body to a fish line comprising a member extending through the aperture of said pilot and embracing the adjacent end of said body and having one end formed with an eye located on the upper side of said body and its opposite end seated in the recess in the under side thereof.

In testimony whereof I affix my signature.

JOSEPH A. NOLAN.